(12) United States Patent
Frederiksen et al.

(10) Patent No.: US 12,700,921 B2
(45) Date of Patent: Aug. 4, 2026

(54) RECEIPT OF SATELLITE ASSISTANCE INFORMATION AT A USER EQUIPMENT

(71) Applicant: Nokia Technologies Oy, Espoo (FI)

(72) Inventors: Frank Frederiksen, Klarup (DK); Jeroen Wigard, Klarup (DK); Rafhael Medeiros de Amorim, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 231 days.

(21) Appl. No.: 18/372,830

(22) Filed: Sep. 26, 2023

(65) Prior Publication Data

US 2024/0106531 A1      Mar. 28, 2024

(30) Foreign Application Priority Data

Sep. 26, 2022    (EP) .................................... 22197857

(51) Int. Cl.
*H04B 7/195*        (2006.01)
*H04B 7/185*        (2006.01)

(52) U.S. Cl.
CPC ......... *H04B 7/195* (2013.01); *H04B 7/18519* (2013.01)

(58) Field of Classification Search
CPC .. H04B 7/195; H04B 7/18519; H04B 7/1851; H04W 84/06; H04W 48/12; H04W 52/0216; H04W 52/0245; H04W 52/0258
See application file for complete search history.

(56) References Cited

U.S. PATENT DOCUMENTS

| | | | | |
|---|---|---|---|---|
| 11,191,056 B2 * | 11/2021 | Fischer | ............... | H04W 64/003 |
| 11,356,928 B2 * | 6/2022 | Wang | .................... | H04W 48/10 |
| 2021/0360461 A1 * | 11/2021 | Duan | ...................... | G01S 7/006 |

FOREIGN PATENT DOCUMENTS

| | | |
|---|---|---|
| WO | WO 2020/197468 A1 | 10/2020 |
| WO | WO 2021/054883 A1 | 3/2021 |

OTHER PUBLICATIONS

EESR (222197857)—May 31, 2023, 23 pgs.
Panasonic Maintenance on Solutions for NR to support non-terrestrial networks (NTN), R1-2203289, 3GPP TSG RAN WG1 #109-e E-meeting, May 9-20, 2022, 7 pgs.
NEC "Discussion on the remaining issues in R17 NR NTN", R1-xx 3GPP TSG RAN WG1 #109-e E-meeting, May 9-20, 2022, 5 pgs.
Ericsson "On IoT NTN maintenance issues" R1-2203632, 3GPP TSG RAN WG1 #109-e E-meeting, May 9-20, 2022, 17 pgs.
Sony "Remaining issues on time and frequency synchronization for IoT-NTN", R1-2111410 3GPP TSG RAN WG1 #107-e E-meeting, Nov. 11-19, 2021, 8 pgs.
InterDigital "Report of [AT118-e][104][NTN] UP corrections: Phase 1", R2-2206194 3 GPP TSG RAN WG2 #118-e E-meeting, Nat 8029m 2922, 28 pgs.
Huawei et al. "Discussion on SIB19 processing and updating", R2-2205301, 3GPP TSG RAN WG2 #118-e, Online May 9-20, 2022, 2 pgs.

(Continued)

*Primary Examiner* — Ankur Jain
(74) *Attorney, Agent, or Firm* — Lippes Mathias LLP

(57)        ABSTRACT
An apparatus and method are provided for determining a time window during which system information blocks containing satellite assistance information should be read in order for the apparatus to reliably maintain up-to-date satellite assistance information.

19 Claims, 4 Drawing Sheets

(56)                    References Cited

OTHER PUBLICATIONS

Destino, et al. "A New Position Quality Metric for NR RAT Dependent OTDOA Positioning Methods", 2019 16<sup>th</sup> Workshop on Positioning, Navigation and Communications (WPNC), downloaded May 6, 2020, 5 pgs.
Radio Resource Control (RRC) protocol specification (Release 17) 3GPP TS 38.331 V17.1.0 (Jun. 2022), 1273 pgs.

* cited by examiner

| Value of schedulingInfoSIB1-NB-r13 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

RECEIPT OF SATELLITE ASSISTANCE INFORMATION AT A USER EQUIPMENT

TECHNOLOGICAL FIELD

Various example embodiments relate to receiving satellite assistance information at a user equipment.

BACKGROUND

Low-earth orbit (LEO) satellites are increasingly used to transparently relay signals between a UE (user equipment) and a gNB on Earth, such that coverage & service can be provided to a UE far away from any terrestrial base station. The LEO satellites move about 7.5 km/s relative to Earth and furthermore operate at altitudes of 300-1500 km. The satellite periodically broadcasts information regarding its location and trajectory. This information is only valid for a limited period and so this information is transmitted along with an indication of its validity.

A UE that wants to communicate via the satellite will require an up-to-date record of this information. To maintain an up-to-date record the UE may determine when the information it has received will expire and from that when it should read updated information. Where the UE cannot be sure that the information will be reliably acquired then determining when to read the updated information becomes more complex.

Embodiments seek to select preferred times to read the required satellite information.

BRIEF SUMMARY

The scope of protection sought for various embodiments of the invention is set out by the independent claims. The example embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: means for receiving and decoding system information, said system information providing satellite assistance information indicative of at least one of the following: location, direction, speed of a satellite or a validity time period indicative of a time period during which at least one of said satellite assistance information is valid; means for determining a time window within said validity time period; and means for controlling said means for receiving and decoding to receive and decode said system information that is broadcast during said time window.

Embodiments recognise that for an apparatus to be able to receive and send signals via a satellite the apparatus should have an idea of the current location of the satellite. This information is broadcast by the satellite and is valid for an indicated time period. The apparatus requires updated information before the valid time period of the previously received information expires. If the quality of the connection with the satellite is not high then there may be difficulties in receiving and decoding the broadcast information, and in this case several broadcasts may need to be received before the information can be successfully decoded. However, receiving many broadcasts increases the power consumption of the user equipment. Embodiments address these competing issues by determining a time window within the validity time period and controlling the means for receiving and decoding to receive and decode system information broadcast during this time window. Embodiments control the means for receiving and decoding to not receive system information during the validity time period outside of this time window.

In some example embodiments, said system information comprises satellite assistance information indicative of location, direction, speed of a satellite and a validity time period.

In some example embodiments, said satellite assistance information comprises satellite ephemeris and said validity time period comprises an Epoch time and a time period.

In some example embodiments, said system information may also comprise an indication of timing advances for pre-compensation of the signals, this may be based on feeder link delay (or common delay), that is the time taken for a return signal from the UE to reach the satellite. There may also be information on how the timing between the gNB and the satellite varies over time—this may be known as common Timing Advance.

In some example embodiments, said system information is broadcast periodically and said means for determining is configured to determine a number of receipts of system information required to provide a desired decoding reliability level, said determining means determining a size of said time window based on said number of receipts of system information.

In some example embodiments, said required number of receipts of system information comprises more than one receipt of system information.

In some example embodiments, said apparatus further comprises means for ascertaining a reception metric indicative of at least one of the following: an elevation angle of said satellite, a quality of a radio link to said satellite and a quality of a received signal from said satellite, said means for determining being configured to determine said number of receipts of system information required to provide said desired decoding reliability level in dependence upon said reception metric.

In some example embodiments, said reception metric comprises a quality of a radio link on which said system information is transmitted.

In some example embodiments, said means for determining comprises an algorithm linking at least one reception metric to said required number of receipts of system information.

In some example embodiments, said means for determining is configured to update said algorithm in dependence upon a determined success or failure of decoding said receipts of system information for at least one of said plurality of reception metrics.

In some example embodiments, said algorithm is based on simulations of the number of receipts of system information required to provide a desired decoding reliability level.

In some example embodiments, said algorithm is based on previous measurements of the number of receipts of system information required to provide a desired decoding reliability level.

In some example embodiments, said reception metric is based on at least one of the following: on RSRP (reference signal received power), RSRQ (reference signal received quality), RSSI (reference signal strength indicator), SINR (signal to interference noise ratio), RSSI (reference signal strength indicator), or CQI (channel quality indicator).

In some example embodiments, said means for determining said size of said time window is configured to determine said size of said time window to encompass said determined required number of receipts of system information.

In some example embodiments, a size of said time window is determined not to encompass further receipts of system information.

In some example embodiments, said means for determining is configured to extend said size of said time window to include processing time for decoding said receipts of system information.

In some example embodiments, said apparatus further comprises means for controlling discontinuous operation of said apparatus, said means for controlling being configured to control said apparatus to transition between an operational mode and a low power mode.

In some example embodiments, said means for controlling discontinuous operation is configured to control said apparatus to be in said operational mode at a start of said time window.

In some example embodiments, said means for controlling discontinuous operation is configured to control said apparatus to be in said low power mode outside of said time window within said validity time period.

In some example embodiments, said means for determining said time window determines said time window to end at an end of said validity time period.

In some example embodiments, said means for determining said time window determines said time window to encompass a determined broadcast of said system information within and closest to an end of said validity time period.

According to various, but not necessarily all, embodiments of the invention there is a method comprising: receiving and decoding system information, said system information providing satellite assistance information indicative of at least one of location, direction, speed of a satellite and a validity time period indicative of a time period during which at least some of said satellite assistance information is valid; determining a time window within said validity time period; and controlling an apparatus to receive and decode further system information that is broadcast during said time window.

In some example embodiments, said system information is broadcast periodically and said method further comprises determining a number of receipts of system information required to provide a desired decoding reliability level, said step of determining a size of said time window doing so based on said number of receipts of system information.

In some example embodiments, said method further comprises ascertaining a reception metric indicative of at least one of the following: an elevation angle of said satellite a quality of a radio link to said satellite and a quality of a received signal from said satellite, said step of determining said number of receipts of system information required to provide said desired decoding reliability level determining said number in dependence upon said reception metric.

In some example embodiments, said step of determining said required number of receipts comprises using an algorithm linking at least one reception metric to said required number of receipts of system information.

In some example embodiments, said method further comprises updating said algorithm in dependence upon a determined success or failure of decoding said receipts of system information for at least one of said plurality of reception metrics.

In some example embodiments, determining said size of said time window comprises determining said size of said time window to encompass said determined required number of receipts of system information.

In some example embodiments, said determining said size of said time window comprise extending said size of said time window to include processing time for decoding said receipts of system information.

In some example embodiments, said method further comprises controlling discontinuous operation of said apparatus by controlling said apparatus to transition between an operational mode and a low power mode.

In some example embodiments, said controlling discontinuous operation comprises controlling said apparatus to be in said operational mode at a start of said time window.

In some example embodiments, said controlling discontinuous operation comprises controlling said apparatus to be in said low power mode outside of said time window within said validity time period.

In some example embodiments, said determining said time window comprises determining said time window to end at an end of said validity time period.

According to various, but not necessarily all, embodiments of the invention there is provided an apparatus, comprising: at least one processor; and at least one memory storing instructions that when executed by the at least one processor cause the apparatus at least to: receive and decode system information, said system information providing satellite assistance information indicative of at least one of the following: location, direction, speed of a satellite or a validity time period indicative of a time period during which at least some of said satellite assistance information is valid; determine a time window within said validity time period; and control said apparatus to receive and decode further system information that is broadcast during said time window.

According to various, but not necessarily all, embodiments of the invention there is provided an apparatus comprising: receive and decode circuitry configured to receive and decode system information, said system information providing satellite assistance information indicative of at least one of the following: location, direction, speed of a satellite or a validity time period indicative of a time period during which at least one of said satellite assistance information is valid; determining circuitry configured to determine a time window within said validity time period; and control circuitry configured to control said receive and decode circuitry to receive and decode said system information that is broadcast during said time window.

In some example embodiments, said system information is broadcast periodically and said determining circuitry is configured to determine a number of receipts of system information required to provide a desired decoding reliability level, said determining circuitry determining a size of said time window based on said number of receipts of system information.

In some example embodiments, said apparatus further comprises ascertaining circuitry configured to determine a reception metric indicative of at least one of the following: an elevation angle of said satellite a quality of a radio link to said satellite and a quality of a received signal from said satellite, said determining circuitry being configured to determine said number of receipts of system information required to provide said desired decoding reliability level in dependence upon said reception metric.

In some example embodiments, said determining circuitry comprises an algorithm linking at least one reception metric to said required number of receipts of system information.

In some example embodiments, said determining circuitry is configured to update said algorithm in dependence upon a determined success or failure of decoding said receipts of system information for at least one of said plurality of reception metrics.

In some example embodiments, said determining circuitry is configured to determine said size of said time window to encompass said determined required number of receipts of system information.

In some example embodiments, said determining circuitry is configured to extend said size of said time window to include processing time for decoding said receipts of system information.

In some example embodiments, said apparatus further comprises discontinuous operation controlling circuitry configured to control said apparatus to transition between an operational mode and a low power mode.

In some example embodiments, said discontinuous operation controlling circuitry is configured to control said apparatus to be in said operational mode at a start of said time window.

In some example embodiments, said discontinuous operation controlling circuitry is configured to control said apparatus to be in said low power mode outside of said time window within said validity time period.

In some example embodiments, said determining circuitry is configured to determine said time window to end at an end of said validity time period.

According to various, but not necessarily all, embodiments of the invention there is provided a non-transitory computer readable medium comprising program instructions stored thereon for performing at least the following: control receipt and decoding of system information, said system information providing satellite assistance information indicative of at least one of the following: location, direction, speed of a satellite or a validity time period indicative of a time period during which at least some of said satellite assistance information is valid; determine a time window within said validity time period; and control receipt and decode of further system information that is broadcast during said time window.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Figures 1, 2:
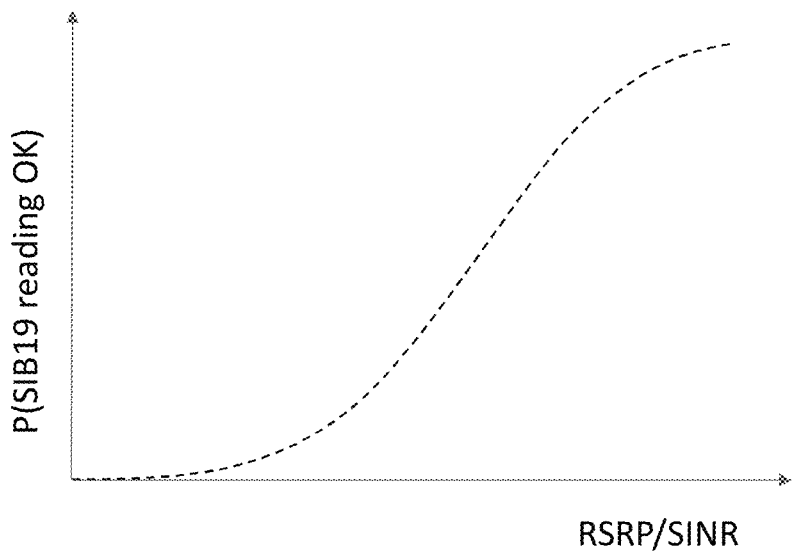
FIG. 1 illustrates how actual reception depends on the quality of the received signal.
FIG. 2 shows an example of how the system information may be scheduled to be repeatedly broadcast.

Before discussing the example embodiments in any more detail, first an overview will be provided.

Embodiments relate to support of 5G NR (new radio) over non-terrestrial networks. In particular the use of low-earth orbit (LEO) satellites to transparently relay signals between a UE (user equipment) and a gNB on Earth, such that coverage & service can be provided to a UE far away from any terrestrial base station.

The LEO satellites move about 7.5 km/s relative to Earth and furthermore operate at altitudes of 300-1500 km. Therefore, a UE will observe fast varying propagation delay and Doppler shift, when communicating with the LEO satellite (and the gNB, which is being relayed through the satellite under the current deployment assumption which is relying on a transparent architecture).

In order to ensure proper time & frequency synchronization, the 3GPP has agreed the UE is responsible for performing pre-compensation of uplink transmissions.

Such pre-compensation is feasible, because the UE is aware of its own location, by use of GNSS (global navigation satellite system), and of the satellite's current and future position in space. The satellite position information is known as ephemeris and provided via System Information Broadcast (SIB) messages. The SIB also includes information on how the timing between the gNB and the satellite varies over time—this is known as common Timing Advance. This NTN (non-terrestrial network) specific information is included in SIB19, which to make the system function well needs to be transmitted very regularly.

Due to the fast movement of the LEO satellites the ephemeris and common TA, collectively referred to as assistance information, is not forever valid. Therefore, the 3GPP has specified that the information is complemented with a validity duration and an Epoch time. The Epoch time denotes the time by which the UE shall assume the assistance information to be valid. Since the assistance information contains time varying parameters such as Common TA descriptors and the satellite position, it is crucial that there is an exact time by which the UE can assume this to be applicable in order for the UE to establish the satellite's position in space at different time instants. This provisioning of Epoch time and valid time enables the UE to determine at which point the information is considered valid and for how long i.e. UE can start the validity timer (corresponding to the network-provided validity duration) at the indicated Epoch time.

The UE does not need to read the assistance information again as long as it has assistance information which has a valid validity timer. For the connection between the UE and the satellite to function current SIB information is required and therefore it can be desirable to ensure good reliability for the SIB reading. The reliability depends on the actual signal reception and interference, as illustrated in FIG. 1, showing that the reliability is lower in case of low signal level or SINR and increases with higher signal levels and/or SINR.

The reliability can be increased by reading the SIB19 multiple times, which is possible as SIB19 will be repeated with small intervals (as defined by the SIB scheduling window). With an increasing number of reading of a SIB the probability of correct reception of at least one of them is increased. Furthermore, in case of IoT (internet of things—in which case SIB31 is used instead of SIB19) the SIB is repeated at every occasion in order to provide coverage, which will also lead to higher reliability if more than one copy is received. In the IoT case the copies can be soft combined which further leads to higher reliability.

FIG. 2 shows an example of scheduling of SIBs—SchedulingInfoSIB1: This IE (information element) indicates the index of the following table. The IE value itself indicates I_TBS for SIB1-NB transmission and for each I_TBS a different number of repetition occurs as is mapped in the second column (Number of NPDSCH Narrowband Physical Downlink Shared Channel repetitions).

Embodiments seek to optimise or at least improve the UE power consumption by optimising or improving the SIB reading while maintaining good reliability.

Figure 3:
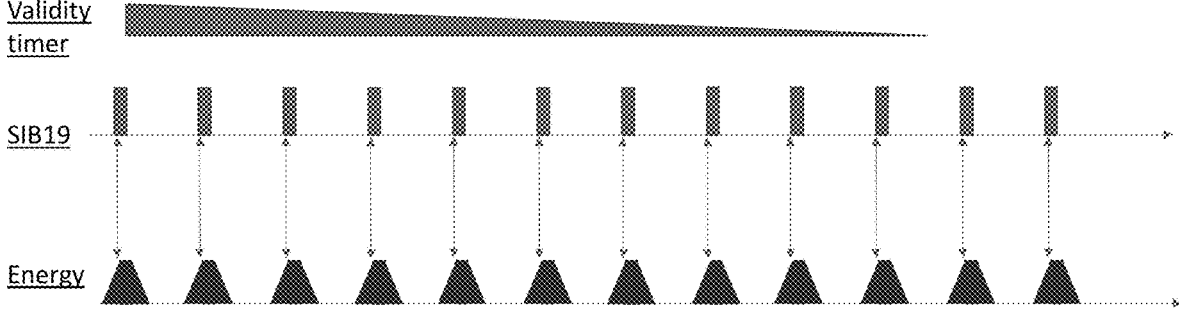
FIG. 3 illustrates energy usage when every SIB is read.

One way to improve reliability would be to read every single SIB transmission, but every reading of the SIB comes with use of energy at the UE side, as shown in FIG. 3, so excessive reading of the SIB information should be avoided. Another choice would be to read only the last SIB before the validity timer expires, but if the link quality is low, this reading may fail, which will increase the risk of UE not having valid assistance information.

Embodiments seek to address these competing issues by:

1. The UE estimating the quality of reception. This can be based on RSRP (reference signal received power), RSRQ (reference signal received quality), RSSI (reference signal strength indicator), SINR, CQI (channel quality indicator) or another metric representing the quality of the connection. Some of the mentioned "quality of reception" metrics are already estimated for mobility or RRM (radio resource management) purposes and are considered readily available.
2. The UE maps this quality metric to an estimated number of required SIB reception attempts to reach a desired reliability level.
3. The UE estimates the length a window X in which it needs to read the SIB occasions, i.e. the window which contains the number of required SIB reception attempts of the previous step.
   A margin D may be included in X to cover for processing times.
4. The UE wakes up at a window X before the validity timer expires and reads the SIBs.

Figure 5:
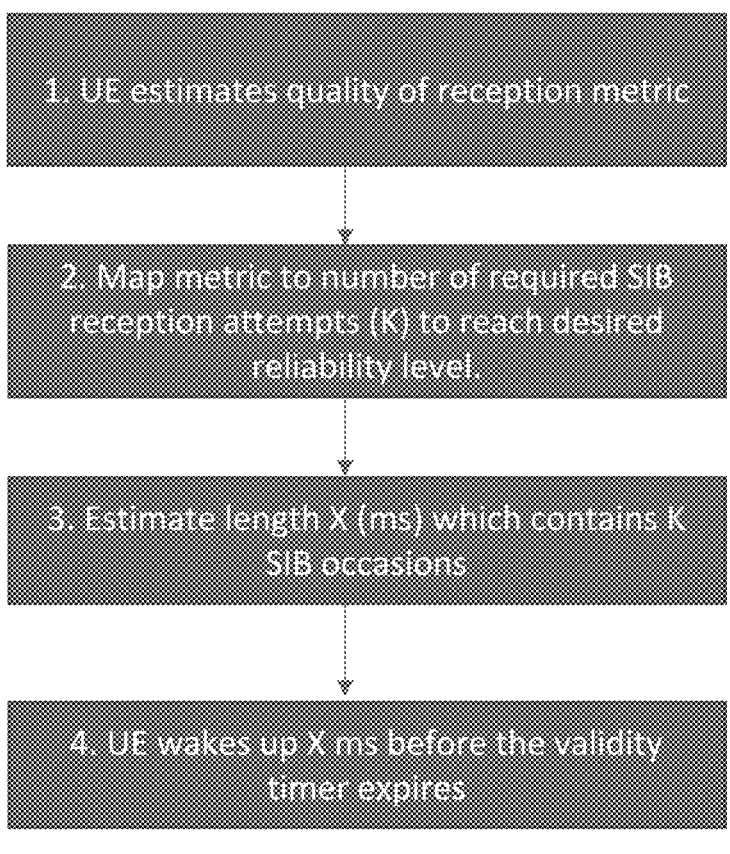
FIG. 5 shows a flow chart illustrating steps in a method of an embodiment.

The above steps are shown schematically in FIG. 5.

Figure 4:
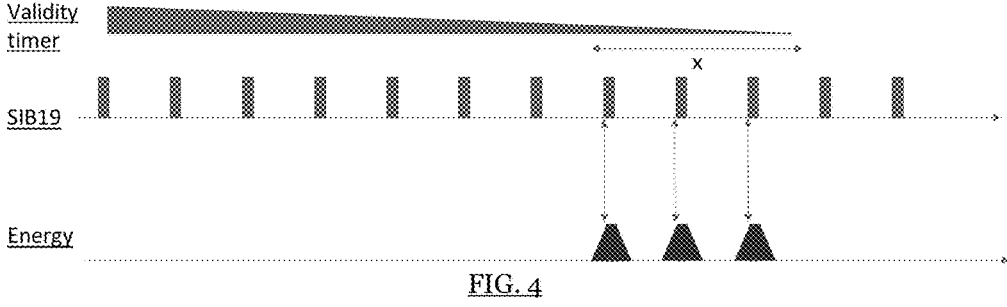
FIG. 4 illustrates selected SIB readings according to an embodiment.

FIG. 4 schematically shows how such a procedure when used in the example of FIG. 3 can reduce energy consumption. As can be seen the number of SIB readings are significantly reduced, and energy usage is correspondingly lowered. The number of SIB readings has been selected based on estimated reception quality to attain the required reliability level. The SIBs closest to the end of the validity period have been selected, such that the next validity period will start later and therefore expire later.

In embodiments the UE is assumed to have acquired the serving satellite ephemeris information (assistance information). Based on this, the UE will know the Epoch time (time of application of the assistance) and the associated validity timer (for how long the information is available).

During normal operation in any of the modes the UE may be in (RRC radio resource control IDLE, RRC INACTIVE, RRC CONNECTED), the UE may monitor conditions of the radio link of the serving satellite. For RRC IDLE and RRC INACTIVE, the UE may be monitoring the RSRP/RSRQ (reference signal received power/reference signal received quality) for the purpose of evaluating the link quality for the serving cell for cell reselection purposes. For RRC_CONNECTED mode the UE may be performing similar measurements for handover purposes, but may also be performing more detailed/accurate measurements for the link quality (for instance the CQI channel quality indicator measurements for link adaptation).

Based on
   the activity of the connection, which gives quality metrics like CQI when being active, the quality of the received signals from the satellite, like RSRP, RSSI (reference signal strength indicator), RSRQ
   and the "age" of the assistance information, which indicates how much of the validity timer is left
the UE is able to assess the required amount of SIB19 readings and when to start reading them to ensure that SIB19 is correctly decoded prior to the expiry of the validity timer.

FIG. 5 shows a flow chart schematically illustrating steps performed at a user equipment according to an embodiment.

In step 1 the UE estimates the quality of a reception metric for receiving the satellite assistance information. The reception metric which is used in step 1 can be RSRP, RSRQ, RSSI, SINR (signal to interference noise ratio), CQI or another metric such as satellite elevation angle.

In step 2 the number of required SIB reception attempts K to reach the desired reliability level is determined. This can be done in a number of ways:

It can be based on simulations or measurement previously done, which simply show the number of required transmissions under a certain quality metric to reach a certain reliability (like 99.9%). Link simulations can be used or a table can be constructed from link tests.

It can be also be done by keeping the previous used values and storing what number of K worked and which did not. By having enough samples the UE should be able to estimate the correct number.

In step 3 the length of the time window X ms sufficient to contain K SIB occasions is determined, in one embodiment the UE may introduce a "margin" (D) as part of step 3 that is used as an offset to the number of decoding attempts that the UE will have. In one implementation of this embodiment, the UE may have an algorithm to adjust the "aggressiveness" of the parameter (D), such that if the UE had an assessment of X=3 for a given RSRP, but found (several times) that only 1 or 2 SIB19 decoding attempts were necessary, the UE may set (D) to "−1" or "−2" to allow for lower amount of reception attempts. In a corresponding manner, the UE may increase the value of (D) in case the UE did not receive the SIB19 properly and lost its UL time synchronization.

In step 4 the UE wakes up X ms before the validity timer expires and reads the SIB occasions that occur within this time window of X ms.

Figure 6:
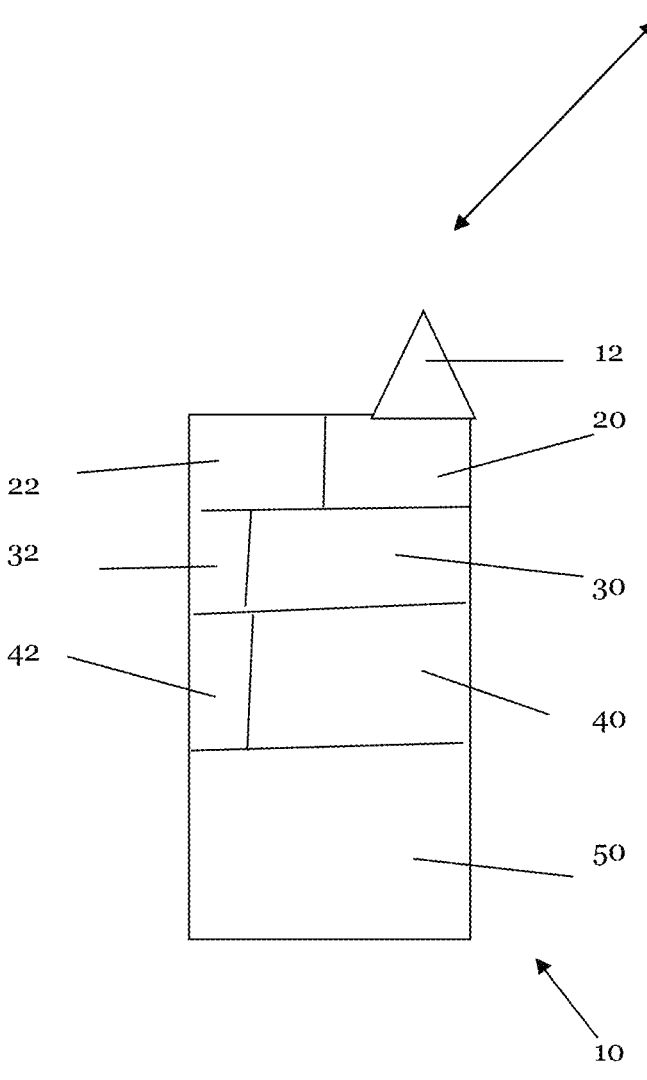
FIG. 6 shows a user equipment according to an embodiment.

FIG. 6 shows a user equipment according to an embodiment. User equipment 10 comprises an antenna 12 and receive and decoding circuitry 20. It also comprises transmitting circuitry 22. The receive and decoding circuitry 20 is configured to receive system information broadcast periodically from a satellite. This may include satellite assistance information indicative of the satellite ephemeris, a valid time period and in some cases an offset timing advance. This system information may be broadcast in system information blocks SIBs. The valid time period indicates a time period during which this information is valid, while the Epoch time in the satellite ephemeris indicates a time at which this information becomes valid. User equipment 10 comprises a validity timer 32 that is set to the value of the valid time period and starts to count at the Epoch time.

User equipment 10 also comprises determining circuitry 30 configured to determine a time window within the validity time period during which satellite assistance information should be received and decoded. The determining means 30 may determine a number of receipts of system information required to provide a desired decoding reliability level and from this it will determine the required size of the time window. In order to do this the determining means 30 may require some indication of a quality of a connection with the satellite and this may be provide by ascertaining circuitry 42.

Ascertaining circuitry 42 is configured to ascertain one or more reception metric indicative of a quality of a connection with the satellite. The ascertaining circuitry 42 may determine these by measuring certain channel quality indicators or by obtaining them from other circuitry within the apparatus that has measured or received them. The reception metrics may include RSRP, RSRQ, RSSI, SINR, CQI and in some cases an elevation angle of the satellite.

The determining means 30 may comprise an algorithm that is able to map at least one of the reception metrics obtained by the ascertaining circuitry 42 to the required number of receipts of system information. This algorithm may have derived such a mapping from previous behaviour or by simulations of a link with the same or similar parameters.

The user equipment may also comprise data store 32 for storing a history of previous decoding successes or failures. The determining circuitry 30 may update the algorithm in response to the data stored in data store 32. In particular, where it is determined that more system information blocks were read than were required for successful decoding, then the determining circuitry may amend the algorithm to reduce the time window. Alternatively, where it is determined that there has been a failure to decode the system information then the algorithm may be amended such that the time window that it determines is extended.

In some embodiments, the determining circuitry 30 determines a time window that encompasses the estimated number of system information broadcasts plus an additional amount to account for processing time.

User equipment 10 may also comprises discontinuous operation control circuitry 40 which controls the user equipment to transition between an operational mode and a low power mode. In some cases the discontinuous operation control circuitry 40 controls the apparatus to be in the operational state at the start of the time window determined by the determining circuitry and to transition to the sleep or low power state at the end of the time window.

User equipment 10 further comprises control circuitry 50 configured to control the receive and decode circuitry to receive and decode system information during the time window determined by determining circuitry 32.

In summary, embodiments provide a user equipment that determines from a reception metric indicative of radio link quality a number of times it may need to require satellite assistance information and sets a time window to encompass this number of broadcasts of this information, the time window being set to be located towards the end of the valid time period for the previously acquired satellite assistance information. In this regard the time window is set to encompass the last SIB in the valid time window, in some cases it expires at the same time as the validity timer. In this way, energy consumption is reduced while reliability is maintained. Selecting the later SIBs to read makes the validity timer for the acquired updated satellite assistance information expire at a later time. The radio link whose quality is being considered may be the radio link with the serving satellite that was used for receipt of previous system information from the satellite.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising at least one processor; and at least one memory storing instructions that, when executed by the at least one processor, cause the apparatus to:

receive and decode system information, said system information providing satellite assistance information indicative of location, direction, speed of a satellite and a validity time period indicative of a time period during which at least some of said satellite assistance information is valid;

determine a time window within said validity time period; and control said apparatus to receive and decode system information that is broadcast during said time window.

2. An apparatus according to claim 1, wherein said system information is broadcast periodically and said determining is to determine a number of receipts of system information required to provide a desired decoding reliability level, said determining a size of said time window based on said number of receipts of system information.

3. An apparatus according to claim 2, further comprising ascertaining at least one reception metric indicative of at least one of the following: an elevation angle of said satellite a quality of a radio link to said satellite and a quality of a received signal from said satellite, said determining being to determine said number of receipts of system information required to provide said desired decoding reliability level in dependence upon said measured at least one reception metric.

4. An apparatus according to claim 2, wherein said determining comprises an algorithm linking at least one reception metric to said required number of receipts of system information.

5. An apparatus according to claim 4, wherein said determining is configured to update said algorithm in dependence upon a determined success or failure of decoding said receipts of system information for at least one of said plurality of reception metrics.

6. An apparatus according to claim 3, wherein said reception metric is based on at least one of the following: RSRP reference signal received power, RSRQ reference signal received quality, RSSI reference signal strength indicator, SINR signal to interference noise ratio, or CQI channel quality indicator.

7. An apparatus according to claim 2, wherein said determining is to determine a size of said time window to encompass said determined required number of receipts of system information.

8. An apparatus according to claim 7, wherein said determining is to extend said size of said time window to include processing time for decoding said receipts of system information.

9. An apparatus according to claim 1, the at least one processor; and the at least one memory storing instructions that, when executed by the at least one processor, further cause the apparatus to: control discontinuous operation of said apparatus, said controlling being to control said apparatus to transition between an operational mode and a low power mode.

10. An apparatus according to claim 9, wherein said controlling discontinuous operation is to control said apparatus to be in said operational mode at a start of said time window.

11. An apparatus according to claim 9, wherein said controlling discontinuous operation is to control said apparatus to be in said low power mode outside of said time window within said validity time period.

12. An apparatus according to claim 1, wherein said determining said time window determines said time window to end at an end of said validity time period.

13. An apparatus according to claim 1, wherein the apparatus comprises a user equipment.

14. A method comprising:

receiving and decoding system information, said system information providing satellite assistance information indicative of location, direction, speed of a satellite and a validity time period indicative of a time period during which at least some of said satellite assistance information is valid;

determining a time window within said validity time period; and controlling an apparatus to receive and decode further system information that is broadcast during said time window.

15. A method according to claim 14, wherein said system information is broadcast periodically and said method further comprises determining a number of receipts of system information required to provide a desired decoding reliability level, said step of determining a size of said time window doing so based on said number of receipts of system information.

16. A method according to claim 15, wherein said method further comprises ascertaining a reception metric indicative of at least one of the following: an elevation angle of said satellite a quality of a radio link to said satellite and a quality of a received signal from said satellite, said step of determining said number of receipts of system information required to provide said desired decoding reliability level determining said number in dependence upon said reception metric.

17. A method according to claim 15, wherein said step of determining said required number of receipts comprises using an algorithm linking at least one reception metric to said required number of receipts of system information.

18. A method according to claim 17, wherein said method further comprises updating said algorithm in dependence upon a determined success or failure of decoding said receipts of system information for at least one of said plurality of reception metrics.

19. A non-transitory computer readable medium comprising program instructions stored thereon for performing at least the following: control receipt and decoding of system information, said system information providing satellite assistance information indicative of location, direction, speed of a satellite and a validity time period indicative of a time period during which at least some of said satellite assistance information is valid; determine a time window within said validity time period; and control receipt and decode of further system information that is broadcast during said time window.

* * * * *